Oct. 16, 1945.  F. E. THOMES  2,386,991
FUEL FEEDING APPARATUS
Filed Jan. 1, 1943  6 Sheets-Sheet 1

INVENTOR
FRANK E. THOMES
BY
ATTORNEY

Oct. 16, 1945.  F. E. THOMES  2,386,991
FUEL FEEDING APPARATUS
Filed Jan. 1, 1943   6 Sheets-Sheet 2

INVENTOR
FRANK E. THOMES
BY
ATTORNEY

Oct. 16, 1945.   F. E. THOMES   2,386,991
FUEL FEEDING APPARATUS
Filed Jan. 1, 1943   6 Sheets-Sheet 3

INVENTOR
FRANK E. THOMES
BY
ATTORNEY

Oct. 16, 1945.   F. E. THOMES   2,386,991
FUEL FEEDING APPARATUS
Filed Jan. 1, 1943   6 Sheets-Sheet 5

INVENTOR
FRANK E. THOMES
BY
ATTORNEY

Oct. 16, 1945.　　　　F. E. THOMES　　　　2,386,991
FUEL FEEDING APPARATUS
Filed Jan. 1, 1943　　　　6 Sheets-Sheet 6

INVENTOR
FRANK E. THOMES
BY
ATTORNEY

Patented Oct. 16, 1945

2,386,991

UNITED STATES PATENT OFFICE 2,386,991

FUEL FEEDING APPARATUS

Frank Eugene Thomes, South Portland, Maine

Application January 1, 1943, Serial No. 471,059

17 Claims. (Cl. 214—26)

This invention relates to improvements in solid fuel feeding mechanism, or coal stokers, and more particularly to apparatus for delivering a fresh charge of solid fuel into the fire box of a heating unit, either at predetermined time intervals under automatic control, or at intervals determined by temperature drop at some one or more selected locations within the building which is being heated or out of doors, or the operation of the fuel feeder may be under manual control and be operated only in response to manual actuation of a control member as an electric switch.

The invention is suitable for feeding hard and soft coal, coke, briquettes and the like solid fuels, and may be combined or associated readily with domestic and industrial boilers, and other heating units and solid fuel consumers, with or without automatic mechanism for ash removal from the ash pit, as may be desired.

It is an object of the present invention to provide improved fuel feeding mechanism especially arranged to distribute a predetermined charge, preferably adjusted at will, of fuel progressively over the fuel bed in the fire box and from one to the other end of the fire box, thereby to obtain a uniform thickness of the fuel bed and to permit gases that may be liberated from the fuel to be ignited by the glowing parts of the fire before they are covered with fresh fuel as well as to secure other advantages, with the apparatus removed from the fire box between feeding operations.

A further object is the provision of mechanism including a conveyor feed screw for delivering the fuel into the fire box, the conveyor screw being reciprocable into and out of the fire box while delivering the fuel thereinto so that the fuel is deposited progressively from one to the other end of the fire box, the arrangement of the feeding apparatus and the apparatus for feeding fuel into the conveyor screw being such as to provide a fuel seal at the entrance of the conveyor screw preventing harmful leakage of air into the fire box above the fire, especially at times when the conveyor is not operating and also preventing flow of combustion gases through the conveyor if the combustion air is supplied at super-atmospheric pressure as may be the case at times.

In screw-feed stokers, especially those adapted for the conversion of hand-feed furnaces to automatic feeding, it is common for the feed screw or worm to be fully loaded with fuel at all times and when an obstruction occurs which jams the screw and prevents it from rotating it often is necessary to remove the fuel bit by bit from the screw before the obstruction is located and can be removed. It is an object of this invention to provide, first, an arrangement for feeding measured amounts of fuel to the conveyor screw so that the screw at no instant has to advance the full predetermined charge of fuel, thereby to reduce the possibility of jamming the screw and to facilitate the removal of the obstruction if the screw does become jammed and to reduce the starting load on the driving motor.

It is among the objects of the invention to employ a screw conveyor for feeding the fuel to the delivery end of a conveyor tube and to move the conveyor and tube as a unit cyclically into and out of the fire box of a boiler or the like during the feeding operation of the screw thereby to distribute the fuel throughout the depth of the fire box during both the inward and outward movements of the screw. The conveyor screw is slidably keyed to a rotatable axial rod mounted exteriorly of the fire box so that the conveyor screw may be rotated by the rod, and the conveyor unit including the screw and the tube simultaneously may slide along the rod to move the delivery end of the tube over the fire from front to back of the fire box and return. Such a construction constitutes a further object of the invention.

Another object of the invention is a construction and arrangement of mechanism to avoid clogging or choking of the conveyor by controlling the delivery of fuel thereto so that the conveyor at no time is fully loaded, and so that fuel delivers into the conveyor only when the conveyor screw is rotating. According to the invention, fuel is delivered to the conveyor indirectly from a main supply hopper, the hopper delivering first a measured and limited quantity to a stationary plate or platform, whence the measured amount is pushed or pulled into a receiving hopper of the conveyor unit which in turn delivers it to the conveyor. One half of a charge of fuel is pulled into the receiving hopper from the platform as the conveyor unit is completing a cycle of operation, so that this half charge is ready in the conveyor to be fed to the fire when the next cycle commences. The second half of the charge is pushed from the platform into the receiving hopper after the conveyor unit has moved into the fire box and after much of the first half of the charge has been fed to the fire. Such an arrangement constitutes a further object of the invention.

A yet further object is to provide a top space in the conveyor tube above the conveyor screw for accommodating unusually large lumps of fuel which otherwise might interfere with the intended operation of the conveyor.

The length of strokes of the conveyor is required to be relatively great in order to move the outlet of the conveyor over the depth or horizontal extent of the usual fire box. It is preferred to effect the long reciprocatory movement of the conveyor by a connecting rod and crank pin mechanism. If, however, the connecting rod were operated by the usual crank pin, the throw of the pin would be so great as to prohibit a compact arrangement of the stoker parts. Hence, it is an object of the present invention to provide a more compact mechanism than a crank pin and specifically to reciprocate the conveyor unit by chain and sprocket actuation of the connecting rod. To this end one end of the connecting rod is connected to the conveyor unit and its other end is connected to sprocket chains whose sprockets are spaced apart in the direction of movement of the conveyor unit an amount permitting one complete circuit of the end of the connecting rod which is secured to the chains for each cycle of movement of the conveyor unit. Such an arrangement constitutes a further object of the invention.

A further object is to combine with the movable conveyor unit a plurality of slicing bars for slicing or stirring the fire during each cycle of conveyor operation.

Another object is to provide an arrangement so that the conveyor tube in its retracted at rest position is closed against inrush of air to the fire by the half-charge of fuel which is standing therein awaiting start of a new cycle of operation.

A yet further object of the invention is the provision of apparatus for automatically cyclically operating the feeding apparatus at different frequencies selected at will and also as selected by a predetermined temperature change in a selected locality.

Still a further object is generally to improve the construction, operation and efficiency and effectiveness of fuel feeders and stokers.

It is, moreover, an important feature that my improved fuel feeder is readily adaptable to all ordinary varieties of boilers and heaters, requiring change only in the doors through which the conveyor unit and slicing bars operate and that the change from stoker to hand feed, and vice versa, can be accomplished quickly since the stoker apparatus is arranged for removable positioning in front of the furnace.

Figure 1:
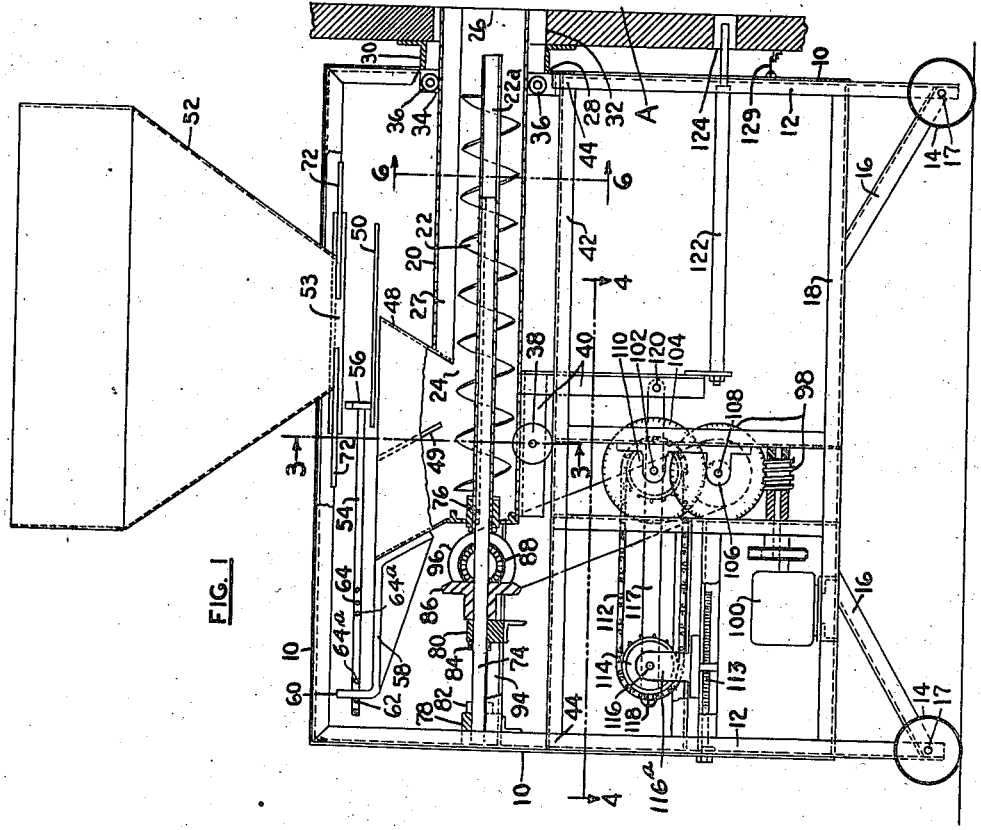
Fig. 1 is a side elevation of fuel feeding apparatus embodying features of the present invention, portions being broken away to show interior parts and details of construction.
Figure 2:
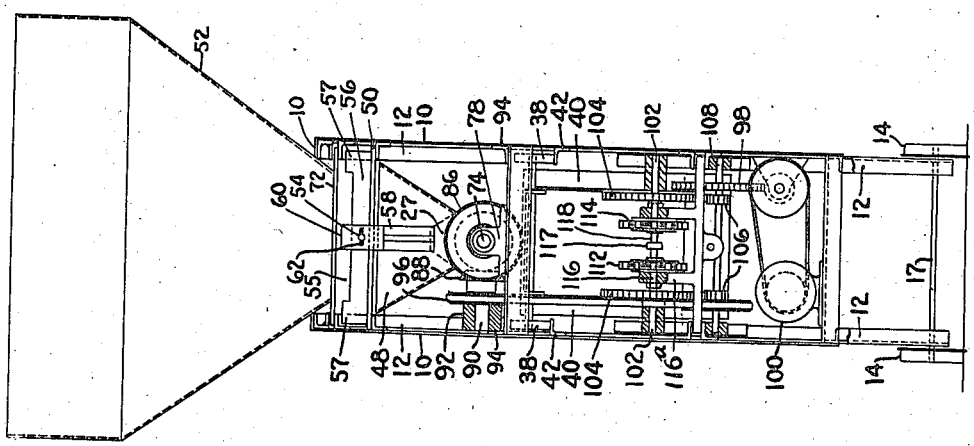
Fig. 2 is an end elevation looking at the left hand end of the apparatus of Fig. 1.
Figure 3:
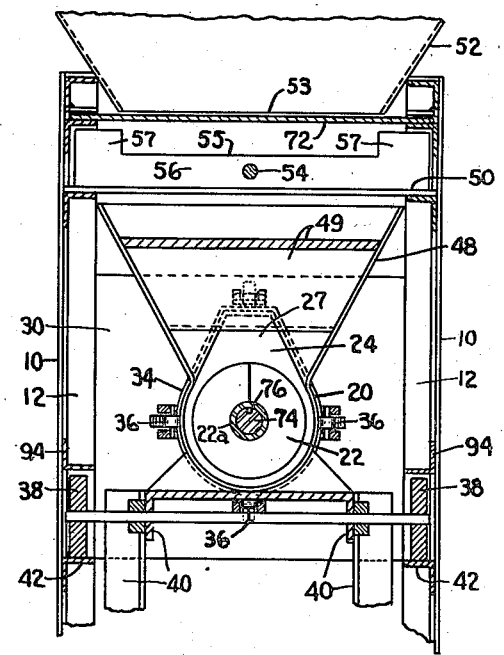
Fig. 3 is a vertical section on the line 3—3 of Fig. 1 but enlarged.
Figure 4:
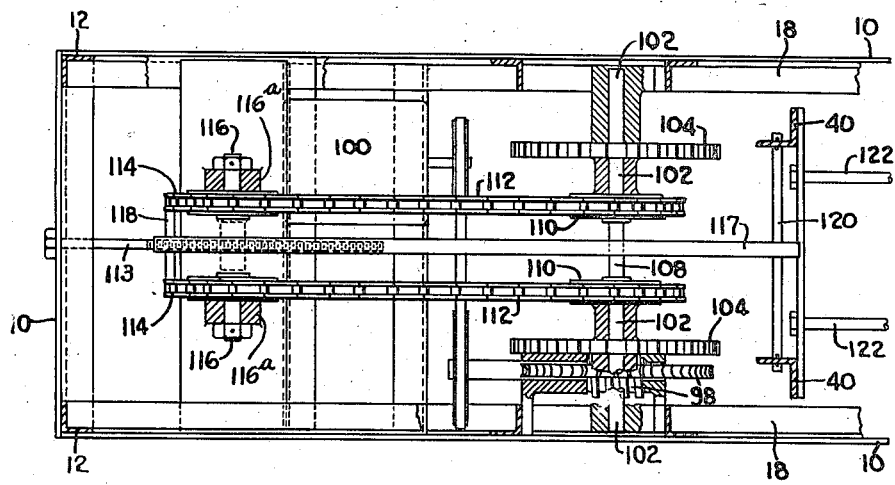
Fig. 4 is a horizontal sectional view on the line 4—4 of Fig. 1 but enlarged.

Referring to the drawings, my improved fuel feeding apparatus preferably is mounted on a carriage or truck so that the apparatus as a unit conveniently and easily may be moved into and out of operative association with the fire box of a domestic or commercial boiler or other fuel consumer which is to be supplied with fuel. The carriage may consist of an angle iron frame enclosed on all four sides and the top by sheet panels 10, one or all of which may be readily removable for getting access to the interior of the housing.

As represented in the drawings, the housing 10 is rectangular with its wall panels secured to the vertical angle iron bars 12 which extend throughout the height of the housing at the corners and project below it where each bar 12 is provided at its lower end with a wheel or caster 14. Each projecting leg part of a bar 12 may be braced if desired by a diagonal brace bar 16 extending between the axle 17 of a wheel 14 and a horizontal base rail 18, one of which extends between vertical bars 12 at each side of the housing 10.

A fuel feeding conveyor is disposed horizontally within the housing 10 and comprises a conveyor tube 20 within which a worm or screw conveyor 22 is rotatable for feeding fuel along the tube from inlet 24 to the open delivery end 26. The conveyor screw closely fits within the tube which is internally circular except that at the top it has a longitudinal channel 27 above the screw extending from inlet to delivery end of the tube adapted to be occupied by pieces of fuel too large fully to enter the screw in their passage along the tube.

The tube and screw are mounted for movement horizontally as a unit for distributing a charge of fuel in a fire box A as the delivery end 26 of the tube traverses substantially the full depth of the fire box, inward and back, during a cycle of operation of the conveyor. The front wall panel 10 has an opening 28 therein through which the conveyor unit is projected, and a special cover plate 30 over the fire box opening 32 has a similar opening 34 closely conforming to the exterior contour of the tube 20 to prevent needless leakage of air into the fire box and through which opening the conveyor unit moves when distributing a charge of fuel in the fire box. Plate 30 also carries rollers 36 which engage the tube at top and bottom and at each side, for centering and guiding support of the forward portion of the tube during its cyclic horizontal movements and while the conveyor unit is at rest in retracted position substantially out of the fire box.

The rear or inlet end portion of the conveyor tube is movably supported within housing 10 by means of wheels 38 suitably mounted, at opposite sides of the conveyor unit, on a frame work 40 having a portion which extends downward from and is movable with the conveyor tube 20. The wheels 38 run on horizontal tracks 42 suitably mounted and fixed on the main frame of the housing, as by being secured to the vertical bars at 44.

According to the invention, fuel is deposited in the conveyor unit only at times when the conveyor screw 22 is operating, and only a part of a complete charge of fuel for a complete cycle of the conveyor is deposited in the conveyor tube at any one stage in a cycle of horizontal movement of the conveyor. To these ends, the inlet mouth 24 of the conveyor tube 20 is provided with a fuel receiving hopper 48 which has considerable length of inlet opening in the directions of movement of the conveyor unit. A platform or shelf 50 is fixed on the main frame directly above the receiving hopper 48 in position such that the hopper inlet is under the forward end of the platform during the latter part of the forward movement of the conveyor into the fire box, and is under the rear end of the platform during the latter part of the movement of the conveyor out of the fire box.

The main fuel supply hopper 52 is located above the platform 50 with its discharge opening 53 in position for gravity discharge of fuel onto the platform whence a feeder or hoe comprising a lost-motion-push-pull rod 54 having a vertical blade 56 at its forward end pushes an accumulation of fuel into the receiving hopper during the final forward travel of the conveyor unit, and pulls another accumulation of fuel into the receiving hopper during the final rearward travel of the conveyor unit. For this purpose the conveyor tube 20 has movable therewith a rearwardly extending bracket 58 with an upstanding ear 60 in which the push-pull rod 54 is guided, the rod having longitudinally spaced pins 62, 64, on opposite sides of ear 60 so that the push-pull rod 54 and its blade 56 remain stationary for a period following each reversal of direction of travel of the conveyor unit until the ear 60 traverses the rod 54 from engagement with one pin 62 or 64 into engagement with the other pin. The rod 54 preferably is provided with a number of openings 64a, Figs. 1, 5, 10, 11, in which the pins 62, 64 may be positioned selectively to adjust the length of stroke of the pusher or hoe, thereby to adjust the amount of fuel delivered into the conveyor per cycle of operation. A partition 49 in the receiving hopper 48 provides so that the part of a charge of fuel in the receiving hopper 48 when the conveyor unit is at rest, effectively blocks off the passage through the conveyor unit against inrush of air to the fire.

As represented in the drawings, the platform 50 forms, in effect, the bottom wall of an open-ended rectangular chamber whose side and top walls restrain and guide the fuel as it is being pushed or pulled by blade 56 toward one end or the other of the platform. The top wall also serves to keep the blade down in contact with the platform, the blade for this purpose having end portions 57, 57 extending approximately into sliding contact with the top wall of the platform tube. The central portion of the blade 56 may have its upper edge portion cut away in the middle part, as at 55, to facilitate the operation of the blade on unusually large lumps of fuel. The length of the shelf 50 preferably is adjusted to the length of stroke of the pusher 56.

Figure 14:
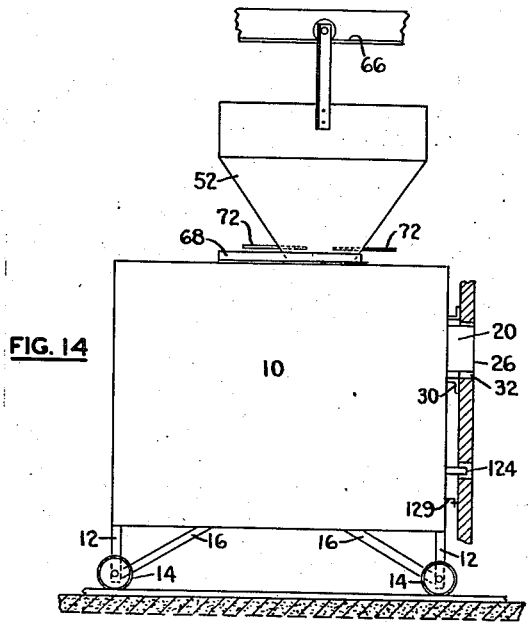
Figs. 14 and 15 are views similar to Figs. 12 and 13 but showing the main fuel supply hopper as a separate element from the truck casing and suspended from tracks.
Figure 15:
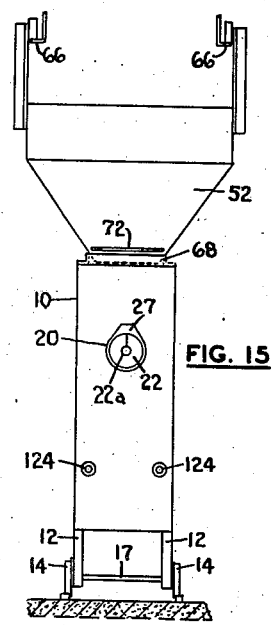

The main supply hopper 52 may be mounted directly on the housing 10 with its discharge end projecting through a suitable opening in the top wall as shown in Figs. 1, 2, 3 and 9, or the hopper may be separate from the housing 10, suspended on tracks 66 as in Figs. 14 and 15, so as to be movable along the tracks to a location for replenishing its supply of fuel and then back to operative relation above the housing 10. Guide flanges 68 preferably are provided on the top of the housing for registering the hopper with the top opening in the housing. A slide valve or gate 72 is provided in the hopper for closing its delivery end and which also can serve to regulate the size of the discharge opening of the hopper and hence the amount of fuel that can collect on the shelf or platform 50. When the supply hopper is mounted directly on the housing 10, a slide valve may or may not be provided as the platform 50 of itself limits the maximum amount of fuel which can accumulate thereon from the supply hopper. Preferably, however, slide valves or plates 72 movable toward and away from each other in the line of conveyor movement are utilized to obtain a less than maximum predetermined charge. For a feeding apparatus designed for use with furnaces of different capacities, the use of a slide valve 72 is desirable as the valve provides ready means for adjusting the feed of the apparatus to the capacity and need of the furnace. The valve also is useful to shut off the fuel flow temporarily without stopping the mechanism in making adjustments.

Rotation of the screw conveyor 22 is effected by the shaft 74 which extends axially of the screw and slidably within the hollow hub 22a thereof and is slidably keyed thereto as at 76. The shaft is rotatably mounted in suitable bearings, as at 78, 80, on the main frame with collars 82, 84 maintaining it against axial movement. Power for operating the conveyor screw 22 is transmitted to shaft 74 through bevel gear 86 fixed on the shaft meshing with bevel gear 88 on a stub shaft 90 which is mounted in a bearing 92, on the longitudinal bar 94 of the frame. A pulley 96 on the stub shaft has belt drive from a speed reducing unit 98 which in turn is driven by electric motor 100 suitably mounted within housing 10.

Figure 5:
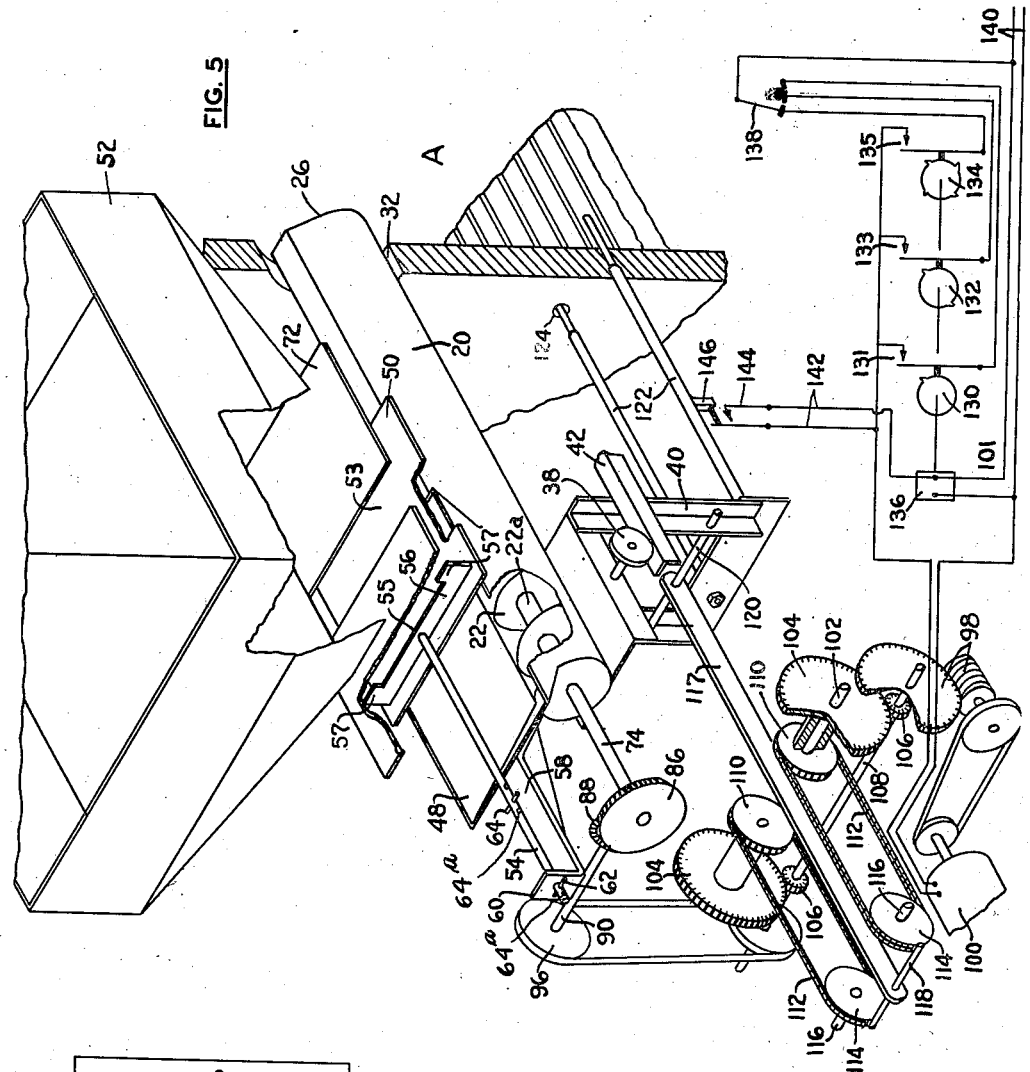
Fig. 5 is a diagrammatic perspective view showing the fundamental operating mechanism with portions broken away and removed and including a wiring diagram for periodic cyclical electrical operation of the fuel feeder.
Figure 6:
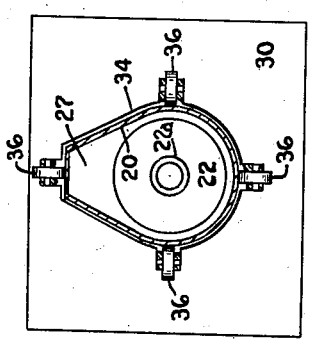
Fig. 6 is a sectional view on line 6—6 of Fig. 1 showing the supporting plate for the delivery end of the conveyor tube.
Figure 7:
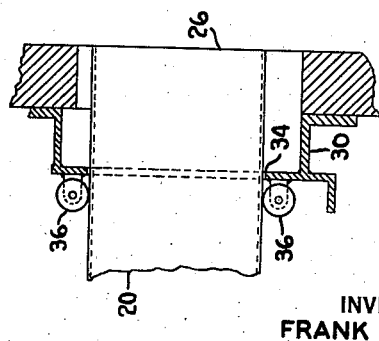
Fig. 7 is a section taken along line 7—7 of Fig. 6, the supporting plate being shown in position on the furnace wall.
Figure 8:
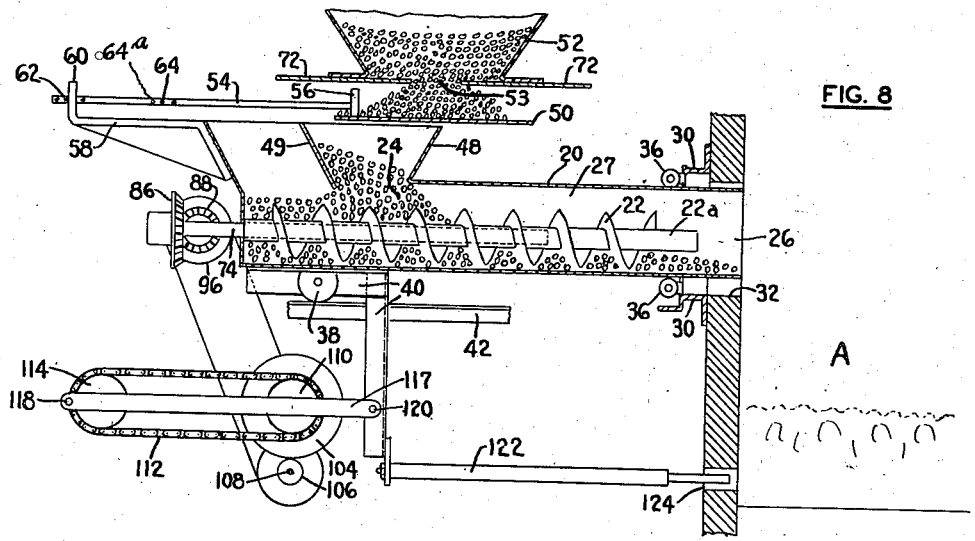
Figs. 8 and 9 are medial vertical sectional views, somewhat diagrammatic, showing respectively the conveyor unit in its position at the start of a feeding cycle and at a half way position in a cycle, and showing also the splitting of a charge of fuel so that one half enters the conveyor unit prior to starting of a cycle and the other half enters at a later time in the cycle.
Figure 9:
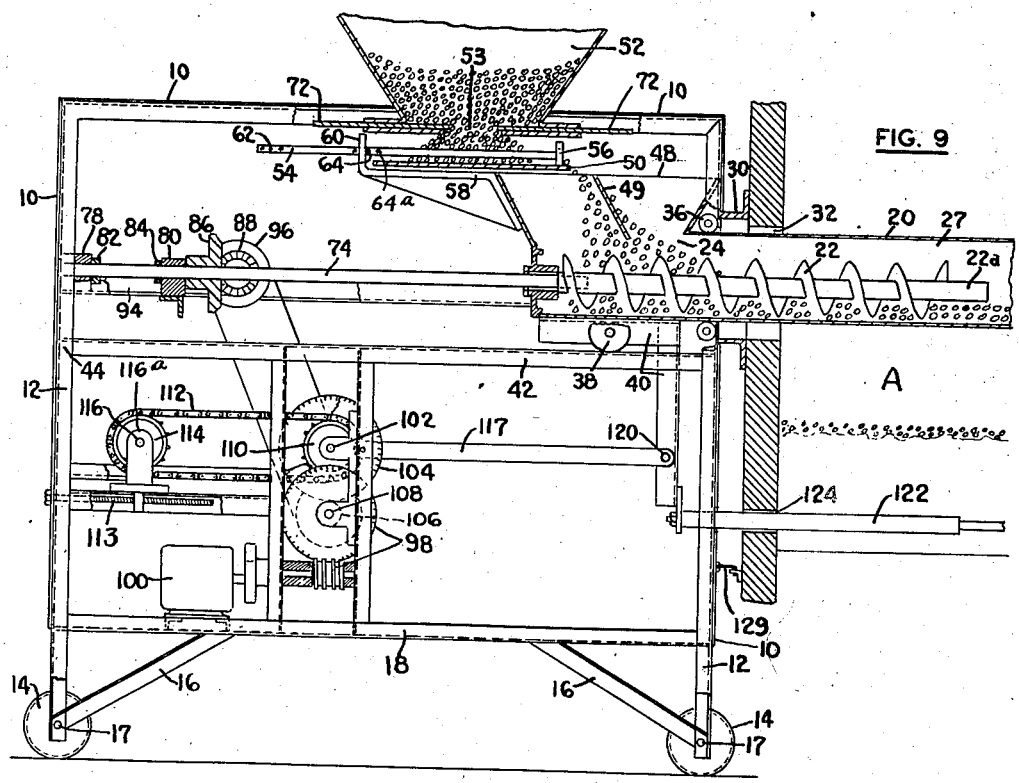
Figure 10:
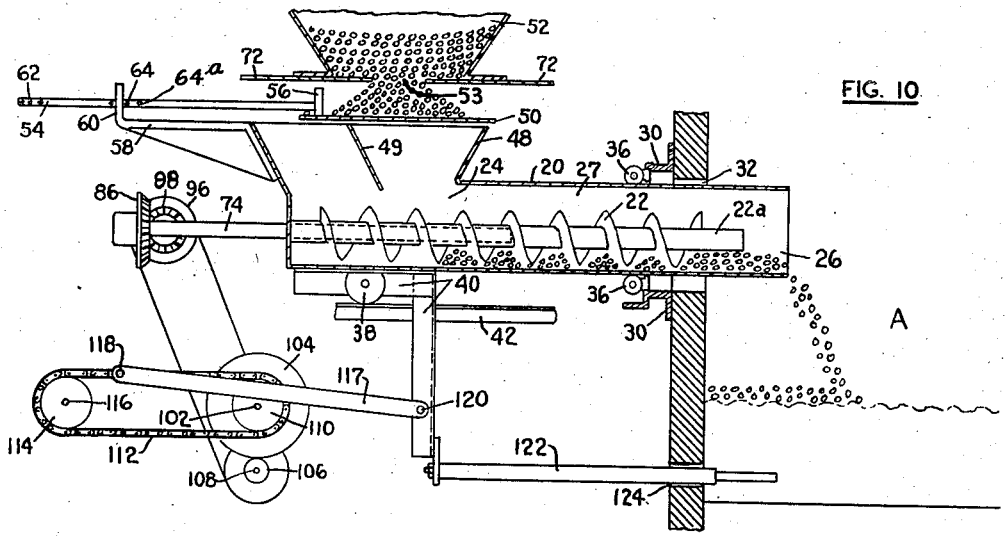
Figs. 10 and 11 are views similar to Figs. 8 and 9 but showing the conveyor unit at different positions in the course of a cycle, Fig. 10 illustrating the position of the parts at the start of the hoe or pusher movement, and Fig. 11 the mid position thereof.
Figure 11:
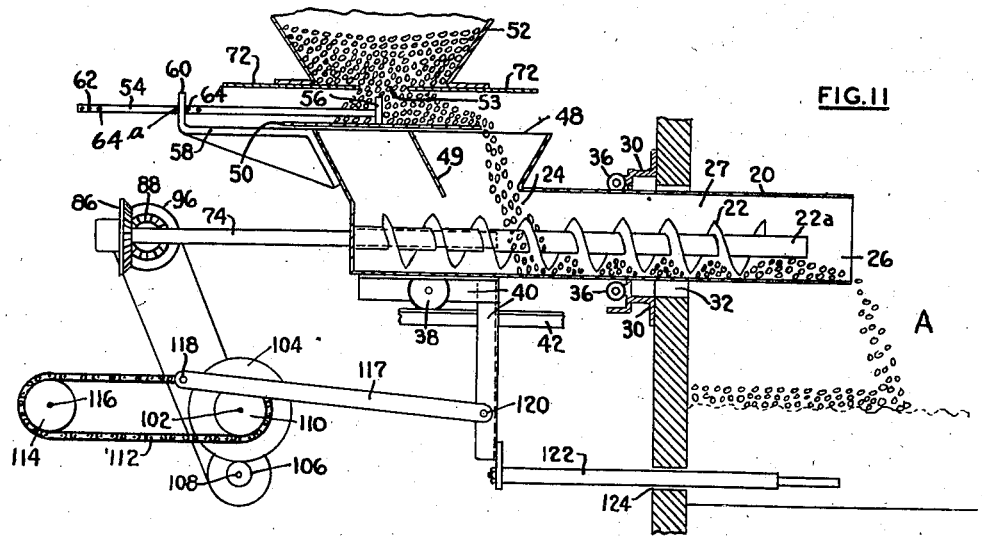

Operation of the motor 100 may be controlled by suitable clock mechanism 101 in the electric circuit, as indicated diagrammatically in Fig. 5, which is adapted to close an electric circuit to the motor at predetermined time intervals, to cause a cycle of operation of the fuel feeder. The final travel of the conveyor unit in direction out of the fire box causes opening of the motor circuit at the end of a complete cycle as will hereinafter be explained more completely.

The forward and back cyclic movements of the conveyor unit are accomplished simultaneously with the operation of the screw conveyor 22 and by the same motive power. For this purpose short coaxial shafts 102 are mounted within housing 10 above the speed reducing unit 98. A relatively large diameter gear 104 rotatable on each shaft 102 meshes each with a pinion gear 106 on the reduced speed shaft 108 of the speed reduction unit. The gears 104 and pinions 106 are identical in speed ratio so that both gears 107 rotate at the same speed. A pair of sprockets 110 is fixed in spaced relation, one on each shaft 102 and rotatably fixed to its associated gear 104, over which sprocket chains 112 are trained and extend over similar sprockets 114 mounted on coaxial shafts 116 at a substantial horizontal distance outward from sprockets 110, in direction away from the fire box. Preferably the shafts 116 are adjustable toward and from the sprockets 110 to maintain a proper tension on chains 112, the shafts 116 being mounted in a bracket 116a slidable on the frame toward and away from the shaft 102. A crank arm 117 is connected as at 118 at its outer end to corresponding links of the chains 112, and the inner end of the crank arm is pivotally connected at 120 to the frame section 40 which extends downwardly from the conveyor tube 20, so that the crank arm pushes the conveyor unit inward through substantially the full depth of the fire box and then pulls it out again as the chains 112 negotiate a complete circuit around their sprockets. This arrangement gives a long stroke of the connecting rod with but a short swing thereof. Slicing bars 122 are carried by the frame 40 and move forward with the conveyor unit, through holes 124 in the front wall of the heater, to slice the fire during each cycle of operation of the conveyor feeding unit.

The chains 112 are maintained free from undue slackness by the chain tightener rod 113 having a screw-threaded connection with the bracket 116a for adjusting its position lengthwise of the chains. The stroke of the apparatus can be adjusted to feed fuel into furnaces of different depths by inserting or removing links of the chains to adjust the stroke suitably to the particular furnace, the rod 113 being long enough to permit a large variation in chain length and consequently stroke.

Figure 16:
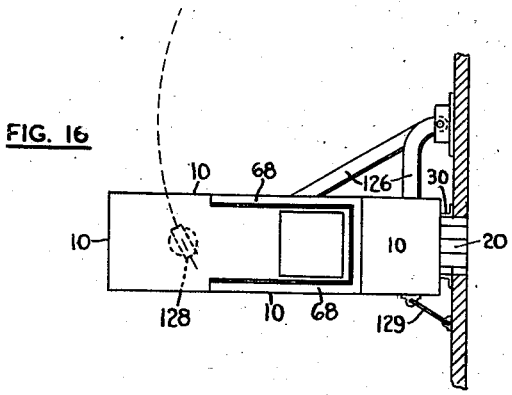
Fig. 16 is a top plan of a modified form of truck unit hinged to the front wall of a fire box and swingable out of operative position.
Figure 17:
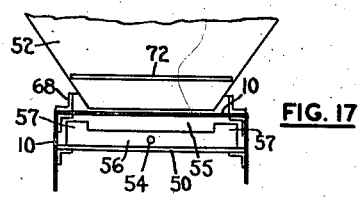
Fig. 17 is a detail, on a larger scale, showing the guide for the lower end of the hopper of Fig. 15.

Fig. 16 shows a modified form of movable support for my fuel feeding apparatus in which suitable brackets 126 at the front and extending to one side are hingedly mounted on the fire door plate, and a single wheel 128, swivelled or not as may be desired, supports the housing on the floor, so that the fuel feeder as a unit may be swung in a circular path between operative and inoperative positions.

One or more hooks 129, or equivalent, conveniently connecting the apparatus with the furnace, may be provided for removably holding the apparatus in operative position.

Figure 19:
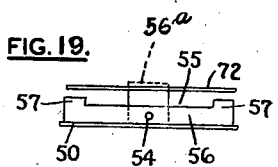
Fig. 19 is an end elevation of the parts of Fig. 18.
Figure 18:
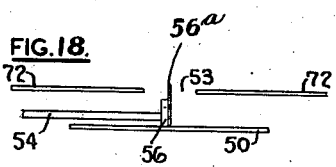
Fig. 18 is a detailed side elevation of a modified form of pusher or hoe having means for preventing the arch-formation of the fuel.
Figure 12:
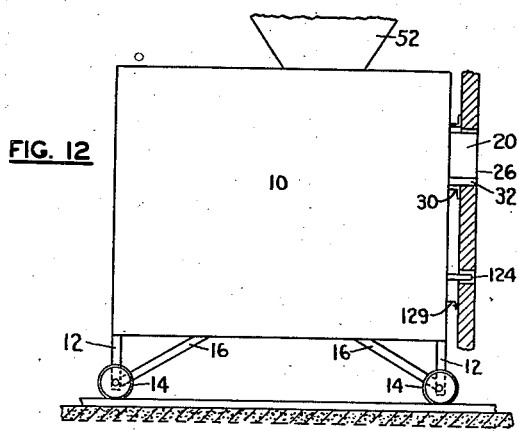
Fig. 12 is a side elevation of a truck unit within whose rectangular casing my fuel feeding apparatus may be mounted, and having the main fuel supply hopper mounted on the casing.
Figure 13:
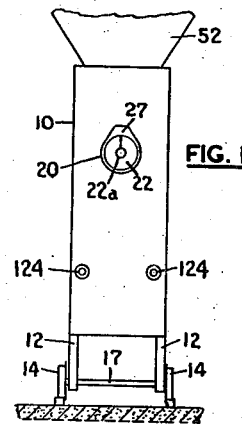
Fig. 13 is an end elevation looking at the right hand end of Fig. 12 but with the front wall of the heater and its associated supporting plate omitted.

With certain types of fuel and under certain conditions there may be a tendency for the fuel in the supply hopper 52 to arch over the discharge opening 53 and hence not feed properly, or insufficiently, through the opening onto the shelf 50 for a feed cycle or so. This arching of the fuel is not particularly harmful as it has been found that the arch soon will break down and the fuel will feed as intended so that the fire does not go out but the arching action, nevertheless, is undesirable as at times the fire may not get the intended amount of fuel. To break up and prevent arching of the fuel the pusher or hoe 56, see Figs. 18 and 19, is provided with a thin flexible and preferably resilient member or plate 56a attached to and upstanding above the plate 56 to a free height that preferably is somewhat above the level of the gates 72. The member 56a is sufficiently flexible to bend to pass under a gate 72 without moving it but when the member leaves the edge of the gate its inherent resiliency causes it to become upright and to enter the opening 53 between the gates and move against any arched formation of fuel that may overlie the opening and dislodge the fuel and thereby cause it to flow through the opening. The arch-breaking member 56a can be of metal or any material having the required characteristics. A strip of leather, such as a section of leather belting has been found satisfactory. A short length of strip is necessary and it need not be as long as the hoe.

Referring to the cycle timing apparatus 101 and especially to the wiring diagram in Fig. 5, the cams 130, 132 and 134, respectively, have one, two and four camming projections or lobes thereon for closing their respective switches 131, 133, 135, once, twice or four times, for example, in the course of one hour. The cams are mounted on a shaft of a clock mechanism 136, driven by a time-controlled synchronous motor, for instance, which makes one complete turn each hour. A switch 138, operated manually or otherwise, may be set to connect any selected one of the cam switches 131, 133, 135 in the control circuit 140. A shunt circuit 142 has a limit switch 144 which is self-closing but which is opened and held open by the lug 146 on one of the slicing bars 122 or other part of the stoker mechanism moving with the conveyor tube when the conveyor unit is in its fully retracted position. With switch 138 in its position as represented in Fig. 5, the four projection cam 134 is operatively connected in the circuit and, as a projection thereof moves around to close cam switch 135, the electric circuit is closed through motor 100 to start a cycle of operation of the conveyor unit. As the conveyor unit and slicing bars move forward, the switch 144 of the shunt circuit closes to maintain a closed circuit through the motor after the cam switch 135 opens and until the completion of a conveyor cycle causes lug 146 to open shunt switch 144, to stop the motor, until another projection of cam 134 initiates another cycle of conveyor operation. The cams merely initiate the operation of the feeding stroke and are arranged to open shortly after the start of the feeding stroke but after sufficient movement to cause the closing of the switch 144 which switch then controls the motor operation and opens to stop the motor at the end of the retraction stroke of the conveyor and before the cam-operated switch is again operated. The illustrated mechanism is arranged to make a complete feeding cycle consisting of a forward and a return stroke of the conveyor tube in about two minutes.

The operation of the apparatus is essentially as follows. At the start of a cycle there is a deposit of fuel on the platform or shelf 50, the amount of which depends upon the distance of the shelf below the opening of the hopper 52 and the spacing of the confining walls around the deposit and the position of the gate or gates 72, and there is fuel in the full length of the conveyor tube and screw and in the hopper 48 of the tube. When the motor circuit is closed by a timing cam 130, 132, 134, the screw starts to rotate and the conveyor tube and the screw begin to move forwardly into the fire box and fuel is projected from the outlet of the tube onto the fuel bed in the fire box. After a short movement of the conveyor the limit switch 144 takes over the control of the motor and before the limit switch opens at the end of the back stroke of the conveyor the cam switch can open by the passage of the cam projection away from it. During the first part of the forward stroke of the conveyor no fuel is delivered into the hopper 48 as the pusher or hoe 56 is motionless by reason of the lost motion connection between the pusher and the advancing part of the conveyor. However, preferably before the fuel in the hopper 48 is exhausted the lost motion between the pusher and the cooperating movable part of the conveyor is eliminated and the pusher begins to advance and to push fuel ahead of it and off the forward edge of the shelf 50 and into the hopper 48 which then is positioned under the forward edge of the shelf. The pusher delivers fuel into the hopper 48 faster than the screw removes the fuel so that the hopper becomes more or less filled with fuel. At the forward end of the stroke of the conveyor as determined by the stroke of the connecting rod the conveyor starts its retraction movement while continuing to deposit fuel onto the fuel bed thereunder. During the advancing movement of the pusher fuel falls from the supply hopper 52 onto the shelf 50 in back of the pusher so that at the start of the retraction movement of the conveyor there is another and approximately equal amount of fuel on the shelf. After a predetermined amount of retraction movement, as determined by the extent of lost motion connection between the pusher and the movable part of the conveyor, the pusher, then acting more as a hoe, moves the fuel off the shelf into the conveyor hopper which is then positioned under the rearward edge of the shelf or platform, the screw meanwhile continuing to rotate and to deliver fuel progressively over the fuel bed. In the extreme retracted position of the conveyor, the limit switch opens and the motor stops with the conveyor tube withdrawn from over the fuel bed but in the opening in the guide plate 30. The hopper 48 contains fuel and the inlet to the conveyor tube and the rear part of the screw is full of fuel which prevents deleterious amounts of air from passing through the conveyor tube into the fire box to impair the furnace draft through the fuel bed therein.

When access to the furnace is desired the apparatus may be moved bodily out of operative position, either by rolling it away from the furnace on its wheels 14 or by swinging it out of the way on its hinges 126.

Loading of the supply hopper 52 can be done by hand by conveying the fuel to the hopper if the hopper is a unitary part of the feeding apparatus or, if the hopper is independent of the feeding apparatus, by first closing the gate or valve 72 and then moving the hopper along its track 66 to the fuel bin or other supply source.

I claim as my invention:

1. Fuel feeding apparatus including a solid fuel conveyor having an outlet, a screw comprising a part of said conveyor operative to advance fuel to said outlet, means for reciprocating said conveyor and screw axially of said screw and for rotating said screw during such reciprocatory movement, and means for introducing separated charges of fuel into said conveyor at different positions of said conveyor; the latter said means comprising a fuel receiving platform and means responsive to movements of the conveyor for forcing a charge of fuel off one end of the platform after a predetermined travel of the conveyor in one direction, and for forcing a charge of fuel off the other end of the platform after a predetermined travel of the conveyor in the opposite direction.

2. Fuel feeding apparatus including a conveyor having a discharge outlet, means for moving fuel through said outlet, a solid fuel containing hopper having a discharge opening, a shelf positioned such distance below said opening that fuel from said hopper rests upon said shelf and is continuous above it with fuel in said hopper and the amount of fuel between said shelf and hopper is dependent upon the distance of said shelf below the hopper opening, means for reciprocating said conveyor to bring one end portion of the conveyor under one end of said shelf during final movement of the conveyor in one direction and the same end portion of the conveyor under the other end of said shelf during movement of the conveyor in the opposite direction and means responsive to movements of the conveyor for moving the charge of fuel off the respective ends of said shelf into said conveyor only when said end portion of the conveyor comes under an end of the shelf.

3. Fuel feeding apparatus including a conveyor having a discharge outlet, means for moving fuel through said outlet, a solid fuel containing hopper having a discharge opening, a shelf positioned such distance below said opening that fuel from said hopper rests upon said shelf and is continuous above it with fuel in said hopper and the amount of fuel between said shelf and hopper is dependent upon the distance of said shelf below the hopper opening, means for reciprocating the conveyor to bring that end portion thereof which is remote from said outlet under one end of said shelf during final movement of the conveyor in one direction and the same end portion of the conveyor under the other end of said shelf during movement of the conveyor in the opposite direction and means responsive to movements of the conveyor for moving the charge of fuel off the respective ends of said shelf into said conveyor only when said end portion of the conveyor comes under an end of the shelf, said charge-moving means having a part operative to permit the deposit of another fuel charge on said shelf following the removal of a preceding charge.

4. Fuel feeding apparatus including a conveyor having a discharge outlet, means for moving fuel through said outlet, a solid fuel containing hopper having a discharge opening, a shelf positioned such distance below said opening that fuel from said hopper rests upon said shelf and is continuous above it with fuel in said hopper and the amount of fuel between said shelf and hopper is dependent upon the distance of said shelf below the hopper opening, means for reciprocating the conveyor to bring that end portion thereof which is remote from said outlet under one end of said shelf during final movement of the conveyor in one direction and the same end portion of the conveyor under the other end of said shelf during movement of the conveyor in the opposite direction and means responsive to movements of the conveyor and including lost motion mechanism for moving the charge of fuel off the respective ends of said shelf into said conveyor, only when said end portion of the conveyor comes under an end of said shelf, the latter said means including also a pusher plate movable across said shelf and between it and said hopper and extended above said shelf toward said hopper opening.

5. Fuel feeding apparatus including a conveyor having a discharge outlet, means for moving fuel through said outlet, a solid fuel containing hopper having a discharge opening, a shelf positioned such distance below said opening that fuel from said hopper rests upon said shelf and is continuous above it with fuel in said hopper and the amount of fuel between said shelf and hopper is dependent upon the distance of said shelf below the hopper opening, a pusher reciprocable in the space between said shelf and hopper opening operative to move the charge on said shelf and to deliver it into said conveyor, said pusher having a construction operative to permit a succeeding charge of fuel to accumulate on said shelf as the first charge is moved away, means to reciprocate said conveyor, means to reciprocate said pusher across said shelf and hopper opening at widely spaced intervals in response to movements of the conveyor, and means providing lost motion between said conveyor and pusher whereby said pusher continues at rest during a substantial travel of the conveyor in each direction of its reciprocating travel.

6. Fuel feeding apparatus including a conveyor tube having a hopper at one end and a discharge outlet at the other end and a rotatable fuel-feed screw in the tube operative to move fuel in the tube through said outlet, means for reciprocating said screw concurrently with said conveyor tube lengthwise thereof, a shelf positioned closely above the path of movement of said tube and hopper and having its opposite open edges terminated intermediate the stroke of the hopper whereby each shelf edge is above the top opening of the hopper at different parts of the reciprocating movement of the hopper in opposite directions, a supply hopper having an outlet positioned above said shelf a distance such that a charge of fuel from said hopper rests on said shelf and is continuous with fuel in said supply hopper, a pusher located in the space between said shelf and supply hopper opening and movable across said shelf and opening to move the charge on said shelf over an edge thereof and into said tube hopper, while permitting a second charge of fuel to accumulate rearwardly thereof on said shelf, and means to reciprocate said pusher at least in part concurrently with corresponding movement of said conveyor tube, the latter said means being connected for movement in timed relation to the movements of the conveyor such that the same portion of the conveyor receives both charges of fuel pushed by the pusher off opposite ends of said shelf but at different times during opposite travel of the conveyor.

7. Fuel feeding apparatus comprising a conveyor tube having a fuel receiving hopper and a discharge opening, a solid fuel feed screw rotatable in said tube for advancing fuel toward said opening, means for rotating said screw at separated intervals, means for reciprocating said tube and screw longitudinally thereof as a unit and means for supplying only two separated charges of fuel to the conveyor during each cycle of its reciprocating travel and for supplying one of said charges in that end portion of the conveyor which is remote from said discharge opening and while said end portion is leading and approaching the limit of its travel in one direction thereby to maintain fuel in said tube in amount sufficient to prevent deleterious flow of air therethrough at idle periods of said screw, said fuel receiving hopper having a partition for guiding incoming fuel into air-flow-preventing relation to the tube and its said fuel receiving hopper.

8. Fuel feeding apparatus comprising a fuel conveyor, a support for mounting the conveyor adjacent to a fire box, a drive shaft for the conveyor rotatably fixed on the support and on which the conveyor is directly mounted for sliding movement and to which the conveyor is slidably keyed, means for reciprocating the conveyor on said shaft in directions longitudinally thereof, the conveyor having a discharge end for depositing a charge of fuel along the course travelled by said discharge end during each cycle of reciprocating movement thereof, and means for supplying a charge of fuel to the conveyor in less-than-a-full-charge quantities at only two different and susbtantially separated stages in a single cycle of reciprocating movement of the conveyor.

9. Fuel feeding apparatus comprising a conveyor tube with screw conveyor therein, said tube having a discharge end, a support for the conveyor tube including means on which the conveyor tube is slidable, a rod rotatably fixed on said support on which the screw conveyor is slidably keyed for sliding movement with the conveyor tube, means for rotating said rod for operating the conveyor, means for moving the conveyor tube and screw conveyor cyclically forward and back relative to said support simultaneously with operation of the screw conveyor by said rod, and means for supplying a charge of fuel to the conveyor during each cycle of forward and back movement thereof.

10. Fuel feeding apparatus comprising a fuel conveyor having a discharge mouth, a support for mounting the conveyor adjacent to a fire box, means for reciprocating the conveyor cyclically in directions longitudinally thereof to deliver a charge of fuel along the course travelled by said mouth during each cycle of operation of the conveyor, a fuel supply hopper mounted above the conveyor, a horizontal plate fixed relative to the discharge mouth of the hopper and spaced below said mouth and above the conveyor, a fuel receiving hopper carried by and opening into the conveyor at the outer end thereof and means coacting with said means for reciprocating the conveyor for depositing in said fuel receiving hopper of the conveyor at different stages of a cycle of reciprocating movement thereof only two accumulations of fuel on said plate, one said accumulation being deposited as the fuel receiving hopper is under one end of said plate and the other when the fuel receiving hopper is under the other end of said plate.

11. Fuel feeding apparatus comprising a fuel conveyor having a discharge mouth, a support for mounting the conveyor adjacent to a fire box, means for reciprocating the conveyor cyclically in directions longitudinally thereof to deliver a charge of fuel along the course travelled by said mouth during each cycle of operation of the conveyor, a fuel supply hopper mounted above the conveyor and having a discharge mouth, a horizontal plate fixed relative to the discharge mouth of the hopper and spaced below said mouth and above the conveyor, a push-pull element resting on said horizontal plate and movable in unison with the conveyor for pushing only a single accumulation of fuel from the plate into the conveyor while the conveyor is moving into the fire box and for pulling only another single accumulation of fuel from the plate into the conveyor while the conveyor is moving out of the fire box.

12. Fuel feeding apparatus comprising a fuel conveyor having a discharge mouth, a support for mounting the conveyor adjacent to a fire box, means for reciprocating the conveyor cyclically in directions longitudinally thereof to deliver a charge of fuel along the course travelled by said mouth during each cycle of operation of the conveyor, a fuel supply hopper mounted above the conveyor, and means operative between the hopper and conveyor for depositing approximately one half of a charge of fuel in the conveyor at one stage of movement of the conveyor in one direction and approximately another half of a charge at one stage of movement of the conveyor in the opposite direction, there being fuel directing means at the inlet to the conveyor for directing the latter said half of a charge into position to close said inlet against inrush of air past the conveyor to the fire box when the conveyor is in retracted idle position.

13. Fuel feeding apparatus including a feed screw, a hopper having a discharge opening, means restricting flow through said opening, a fuel-receiving plate under said opening, and a pusher under said opening operative to move fuel on said plate to the action of said screw, said pusher having a resilient part arranged to enter the hopper opening to a location above the plane of said restricting means and engage any arch-formation of fuel overlying said opening to dislodge fuel and break up the formation.

14. Fuel feeding apparatus including a conveyor having a discharge outlet, means for moving fuel through said outlet, a solid fuel containing hopper having a discharge opening, a shelf positioned such distance below said opening that fuel from said hopper rests upon said shelf and is continuous above it with fuel in said hopper and the amount of fuel between said shelf and hopper is dependent upon the distance of said shelf below the hopper opening, a pusher reciprocable in the space between said shelf and hopper opening operative to move the charge on said shelf and to deliver it into said conveyor, said pusher having a construction operative to permit a succeeding charge of fuel to accumulate on said shelf as the first charge is moved away, means to reciprocate said conveyor, means to move said pusher across said shelf and hopper opening including mechanism operative in response to movements of the conveyor providing a substantial period of time in the movement of the conveyor in each direction during which period the fuel moving effect of said pusher is different from its fuel moving effect during another substantial period of time in the movement of the conveyor in each direction.

15. Fuel feeding apparatus including a solid fuel conveyor having an outlet, a screw comprising a part of said conveyor operative to advance fuel to said outlet, means for reciprocating said conveyor and screw axially of said screw and for rotating said screw during such reciprocatory movement, and means for introducing separated charges of fuel into said conveyor at different positions of said conveyor; the latter said means comprising a relatively stationary fuel-discharging hopper and a relatively stationary plate spaced below the hopper in fuel receiving relation thereto, and a push-pull member movable over said plate between it and the hopper and actuated in response to the reciprocating movements of said conveyor for pushing a charge of fuel from the plate into the conveyor during reciprocating movement of the conveyor in one direction, and for pulling a charge of fuel from the plate into the conveyor during reciprocating movement of the conveyor in the opposite direction.

16. Fuel feeding apparatus including a solid fuel conveyor having an outlet, a screw comprising a part of said conveyor operative to advance fuel to said outlet, means for reciprocating said conveyor and screw axially of said screw and for rotating said screw during such reciprocatory movement, and means responsive to the reciprocating movements of the conveyor for introducing only two separated charges of fuel into the conveyor during each cycle of operation, one charge at a predetermined stage of inward movement of the conveyor, and the other charge at a predetermined stage of outward movement of the conveyor.

17. Fuel feeding apparatus comprising a conveyor having a fuel inlet at one end and a fuel discharge outlet at its other end, means for reciprocating the conveyor axially thereof, a fuel supply hopper fixed in position relative to the reciprocating conveyor and positioned so that said fuel inlet of the conveyor moves under the hopper discharge opening during the reciprocating movements of the conveyor, relatively fixed means intervening between the hopper and the conveyor for intercepting fuel discharged from the hopper and arranged for a predetermined accumulation of fuel thereon to prevent further discharge from the hopper, means responsive to reciprocating movements of the conveyor for delivering fuel from said intercepting means into the conveyor inlet only while said conveyor is approaching its inner and outer limits of reciprocating movements, and means for adjusting the size of the hopper discharge opening thereby to vary the amount of fuel necessary to be accumulated on the interceptor means before further discharge from the hopper is prevented.

FRANK EUGENE THOMES.